No. 772,079. PATENTED OCT. 11, 1904.
S. C. BALL.
SPRING WASHER OR PLATE.
APPLICATION FILED OCT. 26, 1903.
NO MODEL.
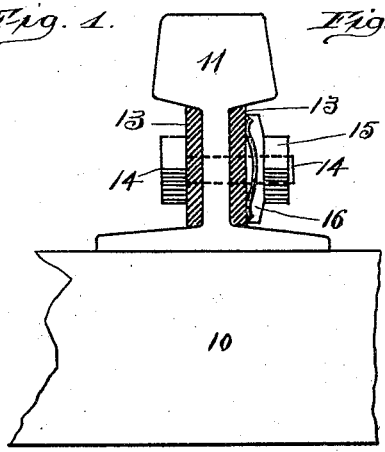
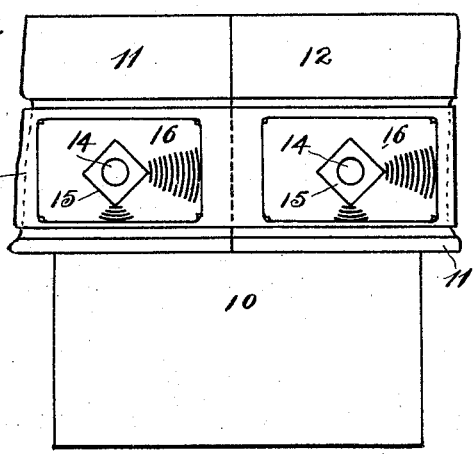
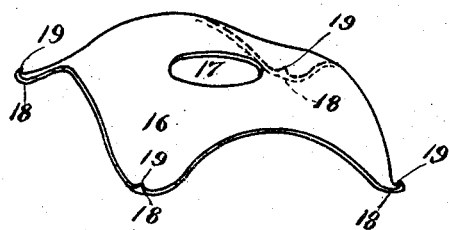
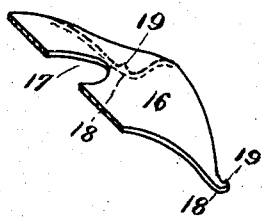
WITNESSES:
Chas. E. Gorton
A. Gustafson
INVENTOR
Samuel C. Ball
BY Chas. C. Tittman
ATTORNEY No. 772,079. Patented October 11, 1904.

UNITED STATES PATENT OFFICE.

SAMUEL C. BALL, OF CHICAGO, ILLINOIS.

SPRING WASHER OR PLATE.

SPECIFICATION forming part of Letters Patent No. 772,079, dated October 11, 1904.

Application filed October 26, 1903. Serial No. 178,506. (No model.)

*To all whom it may concern:*

Be it known that I, SAMUEL C. BALL, a citizen of the United States, residing at Chicago, in the county of Cook and State of Illinois, have invented certain new and useful Improvements in Spring Washers or Plates, of which the following is a specification.

This invention relates to spring washers or plates to be used in connection with the nuts and bolts employed for splices, rail, and other joints; and it consists in certain peculiarities of the construction thereof, as will be hereinafter more fully set forth and specifically claimed.

The principal object of the invention is to provide a cheap and efficient spring washer or plate which will allow for the spreading of the joints under heavy strain as well as for contraction and expansion due to heat and cold and will hold the joints or pieces tight when relieved of such strain and will also prevent the nuts and bolts becoming loosened by the constant and severe shocks and jars to which they are subjected.

Another object is to provide a washer or plate of the above-named character which can be made at a small cost, as it may be cut, punched, and stamped at one operation and requires no special finishing.

In order to enable others skilled in the art to which my invention pertains to make and use the same, I will now proceed to describe it, referring to the accompanying drawings, in which—

Figure 1 is an end view, partly in section, of a railway-rail joint, showing a spring washer or plate embodying my invention in position on one of the bolts thereof. Fig. 2 is a side view in elevation thereof. Fig. 3 is a detached perspective view of the plate, and Fig. 4 is a perspective view partly in section.

Like numerals of reference refer to corresponding parts throughout the different views of the drawings.

The reference-numeral 10 represents a portion of a cross-tie on which the rails 11 and 12 are mounted. Located in the usual manner on each side of the rails at their juncture is a fish-plate 13 of the ordinary construction, through suitable openings in which, as well as in the rails, are passed bolts 14, used for securing the parts together.

Located on that portion of the bolts on which the nuts 15 are secured are spring washers or plates 16, which embody my invention. Each of these plates is made of any suitable size, form, and material, but preferably of spring-tempered steel and rectangular in form, as shown in the drawings, and is bent in the same direction on two lines extending at right angles to each other through the central portion of the plate and has an opening 17 in its middle to receive the bolt. As before stated, the plate may be of any suitable form; but in the present instance I have shown it rectangular—that is, as being longer in one direction than in the other—instead of square for the convenience of description.

The plate, as is clearly shown in Fig. 3, is bent in one direction on the longitudinal axis thereof and in the same direction on the transverse axis thereof in such a manner that its corners 18 only will rest on the fish-plate or one of the pieces which are to be secured together, thus forming a spring washer or plate having resiliency in all directions. As shown in the different views of the drawings, the points 19, formed by the corners, are outwardly turned, thus providing rounded portions or bearings for the plate or washer, which shape will permit the corners to move on the fish-plate or other piece when the washer or spring-plate is compressed. The opening 17 in each of the plates is of sufficient size to allow of the flattening of the plate or washer without binding on the bolts.

In using the washer or plate it is placed over the bolt against the fish-plate or other part to be connected, and a nut 15 is then screwed on, as shown in Fig. 1, the same coming in contact with the curved face or seat of the washer and considerable force being required to screw it up to place, as in so doing the washer is compressed and flattened. When screwed to place, it is firmly held by the outward and yielding pressure of the washer against its inner surface, which will prevent the nut turning or becoming loose on the bolt. It is apparent that the central portion of the washer is supported at a distance from the fish-plate or other part and forms a strong spring to allow of the spreading of the joint or parts connected and will hold the joint tight when relieved of the strain and will also hold the nut by the pressure of the curved or rising faces on the outer surface of the washer against the nut.

While I have shown the spring washer or plate as being applied on the bolt between the nut and one of the fish-plates and in ordinary use will so employ it, yet I may locate it on the bolt between the head thereof and the fish-plate adjoining the same or may use the plates between the head of the bolt and the fish-plate adjacent thereto, and between the nut and the fish-plate adjacent thereto. It is also evident that, if it is desired, a stronger spring may be formed by placing two or more plates on each other and locating them as desired on the bolt, thus augmenting their resiliency.

Having thus fully described my invention, what I claim as new, and desire to secure by Letters Patent, is—

As an improved article of manufacture, a spring washer or plate comprising a rectangular piece curved from one of its ends to the other, the said plate being provided at its middle with an opening and formed with a curve crosswise of the first-named curve, the two curves of the plate extending from the corners thereof, the said curves being outwardly from the piece on which the plate is adapted to rest, and the corners of the plate being outturned to form rounded bearings to rest against the fish-plate or other part, substantially as described.

SAMUEL C. BALL.

Witnesses:
 CHAS. C. TILLMAN,
 A. GUSTAFSON.